A. C. STOPP.
FISH EXCLUDER.
APPLICATION FILED DEC. 2, 1913.
1,095,434. Patented May 5, 1914.
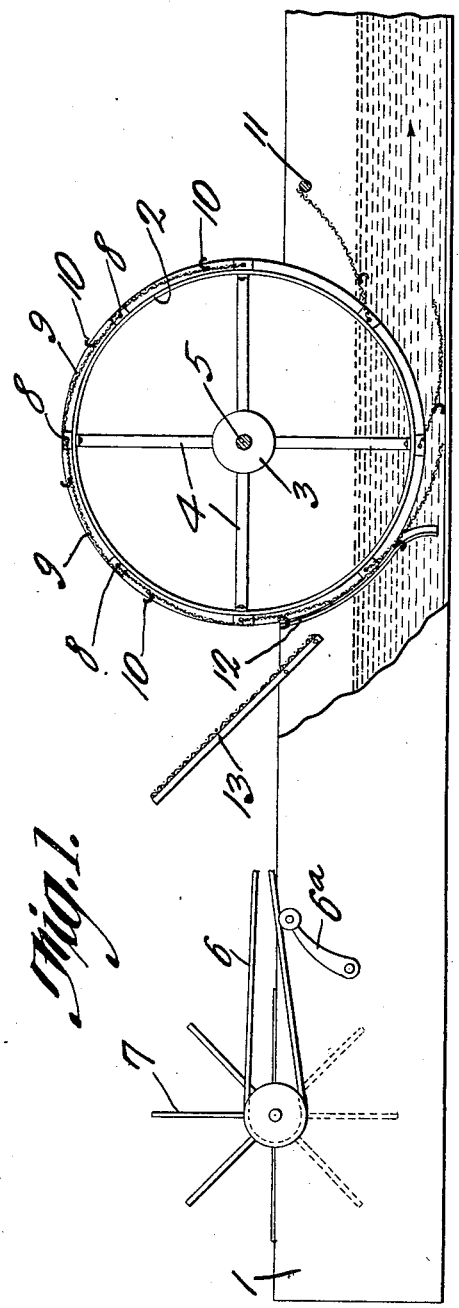
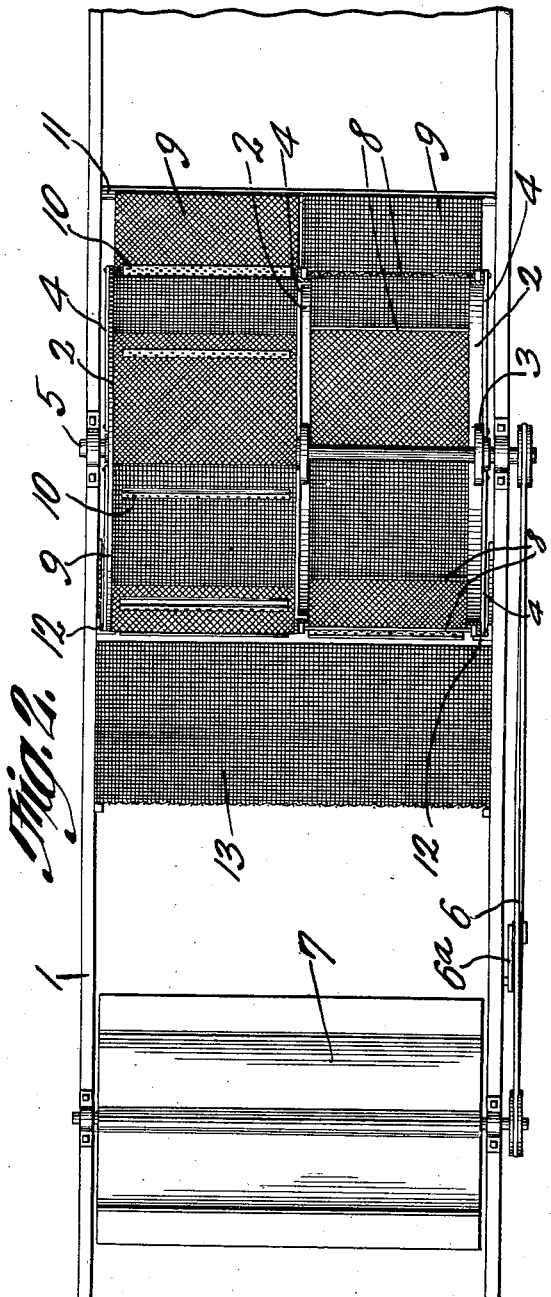

UNITED STATES PATENT OFFICE.

ALVIN C. STOPP, OF STOPPINGTON, ALBERTA, CANADA.

FISH-EXCLUDER.

1,095,434. Specification of Letters Patent. Patented May 5, 1914.

Application filed December 2, 1913. Serial No. 804,315.

*To all whom it may concern:*

Be it known that I, ALVIN C. STOPP, a citizen of the United States, residing at Stoppington, in the Province of Alberta and Dominion of Canada, have invented a new and useful Fish-Excluder, of which the following is a specification.

The present invention appertains to a fish excluder or guard, and aims to provide a novel and improved apparatus of that character.

It is the object of the present invention to provide a fish excluder or guard, adapted to be employed in a sluice, irrigating trunk, or other waterway, and which shall be so constructed and operable, as to prevent fish passing along the sluice, irrigating trunk, or other waterway, so as to enter the water beyond the excluder or guard, and in order that the debris will be carried from one side of the excluder or guard to the other, to prevent clogging.

As a further object, the present invention aims to provide a structure of the nature indicated, comprising a unique assemblage of component coöperable parts, as to best carry out the results desired, whereby the device will effectively exclude the passage of fish therethrough, and will be self cleaning.

A further object of the present invention is to provide an apparatus of the character specified, which will operate to effectively prevent the passage of small fish or minnows therebelow, it being a fact that minnows have a peculiar habit of going to the bottom of a sluice, or other water way which necessitates the provision of efficient means for preventing the minnows from passing underneath the excluder or guard, as would result with the employment of an inefficient apparatus of the present character.

The present invention also contemplates the provision of a device as above described, which shall be comparatively simple, substantial and inexpensive in construction, as well as being simple, practical and efficient in operation.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein :—

Figure 1 is a fragmental side elevation of the improved apparatus as applied to a sluice. Fig. 2 is a plan view of the apparatus, parts being shown in section.

In the drawing, the numeral 1 designates a sluice, irrigating trunk, or other waterway, which may also be taken to represent a stream, canal, ditch, or the like, from which the fish are to be excluded beyond the point at which the excluder or guard is applied.

In carrying out the present invention, there is provided a skeleton wheel or drum embodying a suitable number of angle iron rims 2, which are connected to hubs 3, by means of suitable spokes 4, the hubs 3 being keyed or secured upon a transverse shaft 5, the terminals of which are journaled to suitable bearings, mounted upon the sides of the sluice 1, in order that the lower or bottom portion of the wheel or drum may be disposed within the sluice, to fill in the space between the sides. The bottom portion of the wheel or drum is spaced slightly from the bottom of the sluice, and the ends of the wheel or drum are also spaced slightly from the sides of the sluice, to permit the wheel or drum to rotate freely and without interference. The said wheel or drum is rotated against the current of the stream through the medium of the shaft 5, by any suitable means, it being preferable to employ an under shot water wheel 7 in advance of the said skeleton wheel or drum, the shaft of the water wheel and drum being connected by a crossed belt 6, in order that the drum will rotate in a direction opposite to that of the water wheel, whereby the lower run of the drum will travel in a direction opposite to the flow of water. The water wheel 7 is sufficiently small, to permit the fish to pass the same in a ready manner, in order that should the fish pass the water wheel, they may readily return after encountering the excluder or guard. The belt 6, which may be a sprocket chain, or other power transmitter, is preferably held taut by means of a tightener 6ª of any suitable character.

Journaled to the rims 2 of the skeleton wheel or drum, is a circumferential series of longitudinal rods 8, and to each of the rods 8 is attached a curved or arcuate screen or reticulated vane 9. The vanes or wings 9 are adapted to overlap, as illustrated in Fig. 1, that is, the free edge of each vane or wing is adapted to overlap the pivoted edge of the adjoining or companion vane or wing, over the respective pivot rod or spindle 8. In this manner, the inward movements of the vanes or wings are limited, and when the vanes or wings are swung against each other, so as to overlap, they will provide a relatively smooth surface for the drum, it being understood; however, that the vanes or wings are free to swing outwardly, and are so pivoted to the drum so as to drag upon the bottom of the sluice, when the drum is in operation. Upon the outer side of each of the screens or vanes 9, is attached a perforated, elongated scoop or channel 10, which is disposed parallel with and adjoining the corresponding rod 8. The scoops or debris collectors are disposed intermediate the free and pivoted edges of the respective screens. There is also preferably employed a cross bar 11 between the sides of the sluice adjoining their upper edges, and directly in rear of the drum, in order that the free portions of the screens or vanes will strike the cross bar 11, as the screens overbalance and swing downwardly at the rear or back side of the drum. The function of the cross bar 11 is to sharply or quickly arrest the downward swing movement of the screens, in order that the jar will remove any debris carried by or clinging within the scoops 10, in order that the dislodged debris will be carried off by the stream of water.

In order to swing the screens or vanes against the periphery of the drum, as the screens leave the bottom of the sluice, there are provided two curved or arcuate guides 12, attached to the sides of the sluice adjoining the rims of the drums. The guides 12 project into the paths of the remote ends of the screens or wings, whereby as the ends of the screens engage the guides 12, the screens will be swung to a position against the periphery of the drum, as will be clear by reference to Fig. 1. The guides 12 also have the function of closing the gap between the sides of the sluice and the ends of the drum, so as to prevent the fish from passing between the sides of the sluice and the drum. There is also preferably employed, a stationary guard 13, in advance of the drum, which is so positioned and inclined, as to prevent the larger fish from jumping toward or over the top of the drum.

In operation, the water wheel 7 being actuated by the flow of water, will rotate the excluding or guard drum in opposition to the flow of water, as above indicated. As the screens or vanes 9 are carried underneath the drum, they will drag upon the bottom of the sluice, to close the gap between the drum and the sluice bottom, so as to prevent the passage of fish therebetween. The screens or vanes 9 are sufficiently heavy, so as to bear upon the bottom of the sluice with enough pressure to prevent the fish from raising the screens, by contact therewith, and to cause the fish to be dragged back in an effective manner. The screens being curved will ride snugly upon the bottom of the sluice, to carry out the results desired in the best manner, and as the screens leave the bottom of the sluice, they will be moved to closed position against the periphery of the drum, by the guides 12. This would prevent the screens from hanging idly, which would leave openings between the companion screens, during their ascent, and which would permit the fish to pass through the device, as will be apparent.

The scoops 10 being carried by the screens, will catch the debris, such as sticks, straws, chaff and the like, and will convey them over the drum to the rear thereof, from whence the loose debris within the scoops will be discharged into the stream of water, to be carried off thereby. Should any of the debris cling or adhere to the scoops, the same will be jarred loose or dislodged by the screens striking the cross bar 11 as the screens overbalance and swing downward at the back of the wheel. After the successive screens are released from the cross bar 11, they will swing downwardly against the bottom of the sluice, as above stated. The apparatus will thus be automatically cleaned, to prevent clogging, it being apparent from the foregoing taken in connection with the drawing, that the other objects aimed are carried out satisfactorily.

Having thus described the invention what is claimed is:—

1. In a device of the character described, a skeleton drum, adapted to be partially submerged in a stream, screens pivoted to the periphery thereof to drag upon the bottom of the stream and adapted to overlap, means for overlapping the screens when leaving the bottom of the stream, and means for rotating the drum against the current of the stream.

2. In a device of the character described, a skeleton drum, screens pivoted to the periphery thereof and adapted to overlap, and guides coöperating with the successive screens to overlap the same during their ascent.

3. In a device of the character described, a skeleton drum, arcuate screens pivoted to the periphery thereof, and arcuate guides coöperable with the screens to successively swing the same against the periphery of the drum during their ascent.

4. In combination with a sluice, a skeleton drum rotatably carried between the sides thereof, screens pivoted to the periphery of the drum and arranged to overlap, and guides secured to the sides of the sluice and coöperating with the ends of the screens to overlap the screens when leaving the bottom of the sluice.

In testimony that I claim the foregoing as my own, I have hereto affixed my signature in the presence of two witnesses.

ALVIN C. STOPP.

Witnesses:
W. C. ROBINSON,
HOLTON HALL.

Copies of this patent may be obtained for five cents each, by addressing the "Commissioner of Patents, Washington, D. C."